United States Patent [19]

Thomas

[11] Patent Number: 5,351,990
[45] Date of Patent: Oct. 4, 1994

[54] INSULATING FLOOR FORMING TRAILER MAIN BEAM UPPER FLANGE

[75] Inventor: Michael I. Thomas, Savannah, Ga.

[73] Assignee: Great Dane Trailers, Savannah, Ga.

[21] Appl. No.: 41,958

[22] Filed: Apr. 2, 1993

[51] Int. Cl.⁵ .................... B62D 21/20; B62D 25/20
[52] U.S. Cl. ..................................... 280/789; 296/182; 296/204; 52/309.9
[58] Field of Search ............... 296/182, 204, 183; 52/309.9, 309.14, 79.1, 143; 280/789

[56] References Cited

U.S. PATENT DOCUMENTS

| | | | |
|---|---|---|---|
| 2,743,940 | 5/1956 | Bohlen | 280/789 |
| 3,003,810 | 10/1961 | Kloote et al. | 296/181 |
| 3,380,216 | 4/1968 | Spence | 296/181 |
| 4,049,285 | 9/1977 | Chieger | 296/182 |
| 4,951,992 | 8/1990 | Hockney | 296/183 |
| 5,054,843 | 10/1991 | Gray | 296/182 |
| 5,181,353 | 1/1993 | Harrington | 52/79.1 |

FOREIGN PATENT DOCUMENTS

WO88/07485 10/1988 PCT Int'l Appl. ............... 296/182

OTHER PUBLICATIONS

Catalog-Stoughton Model ASDCW, Approx. 1988–1989, Domestic Container.
Catalog-Stoughton, Domestic Container and 3" Gooseneck Chasis, Approx. 1992.
48 Foot Container Figures–12 Sheets.
Brochure-Great Dane Aluminum Plate Freight Vans.

*Primary Examiner*—Karin L. Tyson
*Attorney, Agent, or Firm*—William Squire

[57] ABSTRACT

Two parallel main steel beams extend from front to rear of a trailer which beams terminate at their upper web edges with aligned aluminum-extruded H-shaped beams having a depending leg which is bolted to a steel beam web. A plurality of aluminum-extruded upper floor sections including a floor member and depending beams are interlocked and welded to one another at their edges to form a floor assembly. Side rails extend from front to rear of the trailer and have an upper leg interlocked with and welded to the upper floor assembly. A lower side rail leg is glued to a bottom aluminum sheet skin member. A rigid polyurethane foam layer is within each of the volumes formed by the bottom skin layers, the side rails, the H-beams and the upper floor assembly to form a composite platform structure which resists bending and shear loads. Braces further support the steel beams and platform assembly.

32 Claims, 4 Drawing Sheets

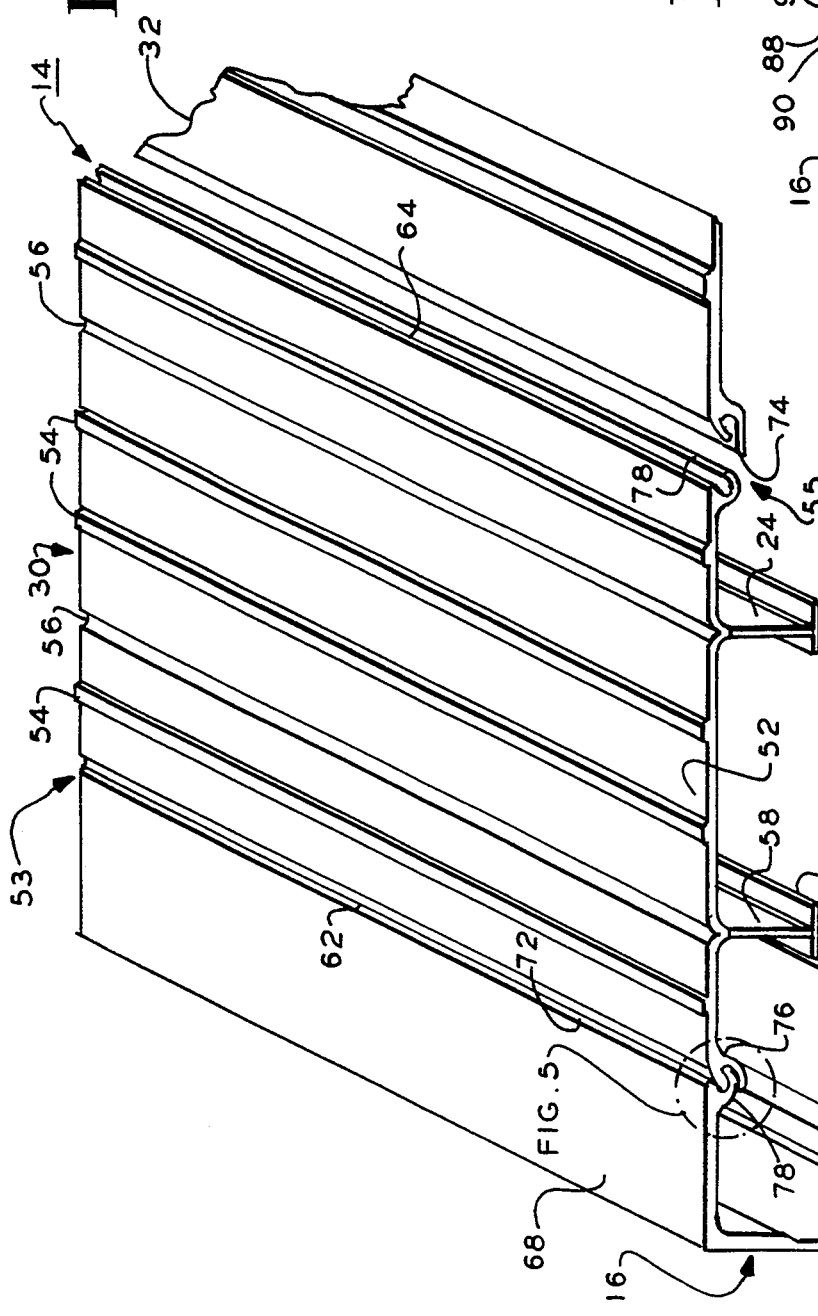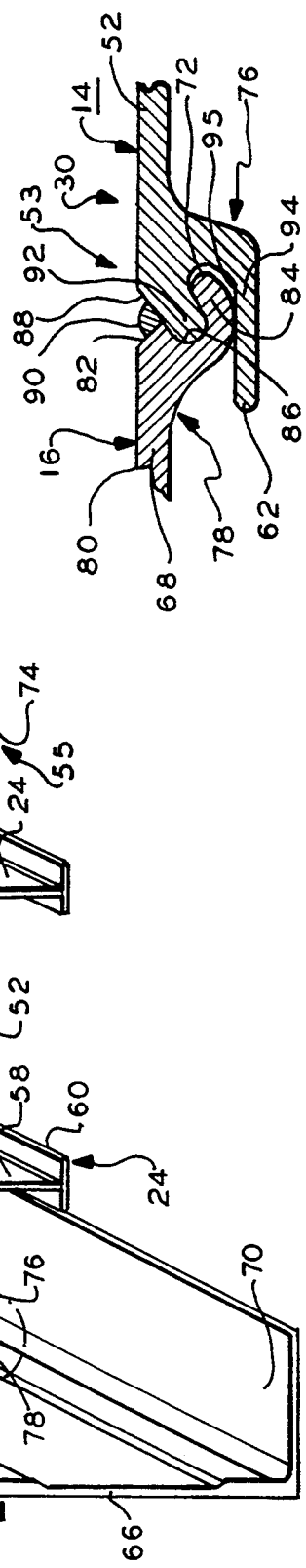

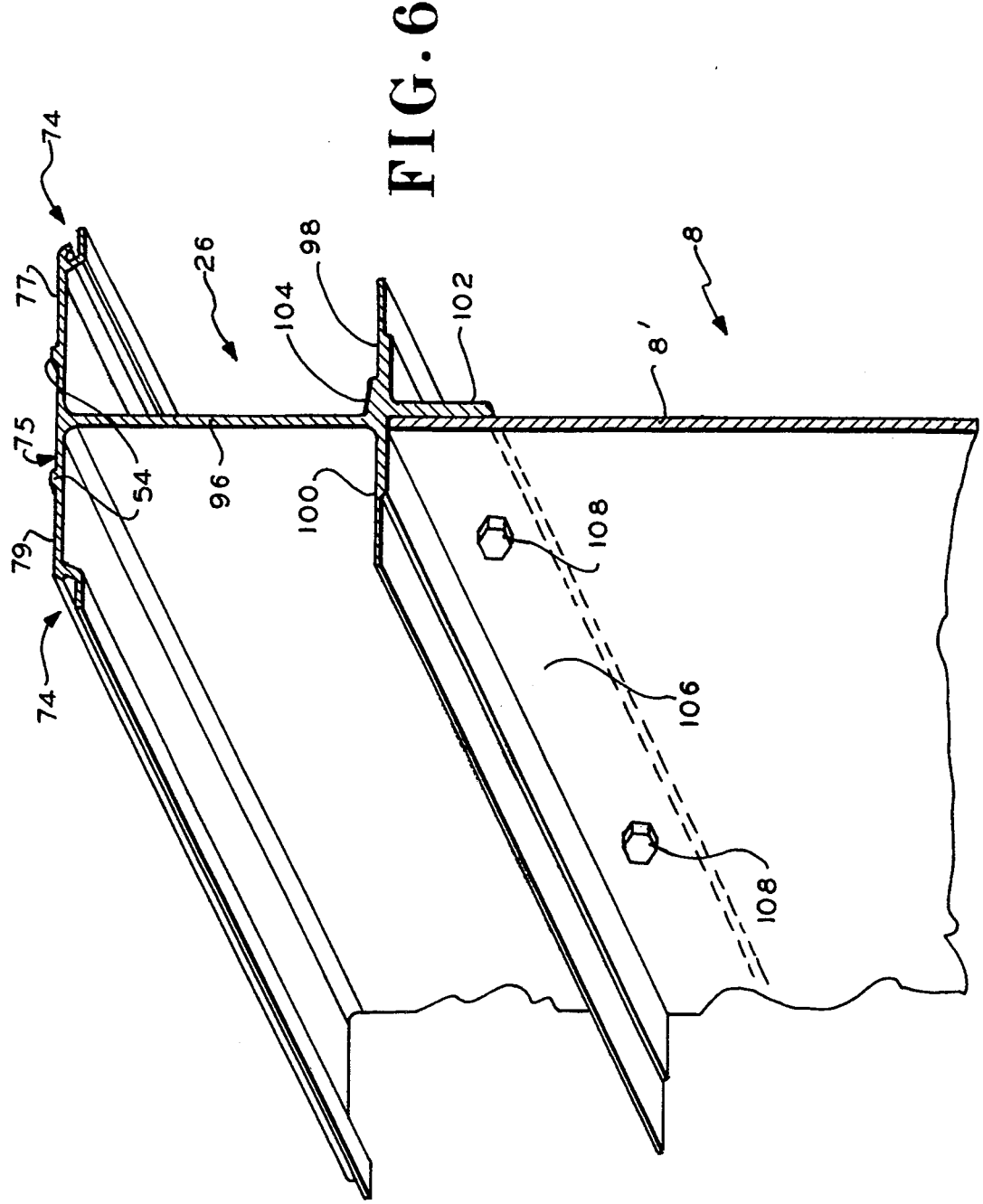

INSULATING FLOOR FORMING TRAILER MAIN BEAM UPPER FLANGE

BACKGROUND OF THE INVENTION

This invention relates to a platform and support structure for use in trailers in combination with truck tractors. More particularly, the invention relates to a floor and beam construction for use in such trailers.

Prior art truck trailer support floor and beam constructions comprise a pair of main steel or aluminum I beams running from front to rear of the trailer. The beams have a vertical web and upper and lower flanges. The beams may have different web heights, especially in front of the trailer to accommodate the tractor portion which receives and secures the trailer via a king pin assembly. The trailers which may be 33 feet or more in length comprise a plurality of aluminum or steel I beam cross-members which run transversely of the main beams. The cross beams may include a central cross-beam secured between the two main beams and cantilevered cross-beams secured to the outer side of each of the main beams to form aligned cross-beams. The cross-beams may be welded or bolted to the main beams.

Flooring comprising extruded aluminum or wood planks is secured on top of the cross-beams and the main beams. The extruded aluminum floor may have depressions and ridges therein running from front to rear of the trailer to provide wear surfaces for cargo. A U-shaped aluminum or steel side rail is secured to the sides of the trailer at the ends of the aluminum cross-members on each side of the trailer. An aluminum or steel stake pocket and rub rail member is secured exterior the aluminum side rails. The side rails extend from front to rear of the platform formed by the cross-beams and the aluminum floor. The side rails each may have one leg which is coextensive with the bottom flange of an exterior-most aluminum cross-member and a second leg member which is flush with the top surface of the extruded aluminum floor. A steel arrangement differs from this.

The aluminum side rails are welded or otherwise secured to the aluminum cross-beams and floor to form a finished floor support structure. A plurality of spaced aluminum bracing tubes are connected between the main I-beams adjacent to the bottom flanges thereof along the length of the trailer. A set of spaced diagonally-arrowed aluminum brace tubes are connected between the exterior sides of the main-beam lower flanges and the underside of the exterior ends of the aluminum cross-members to provide torsional resistance to the platform structure.

The above-described platform is a combination of steel and aluminum and is relatively heavy. For example, the main steel beams extend from the region adjacent to the upper load-bearing surface of the aluminum floor to the base bottom flange of the beam and may comprise, for example, 7 gauge steel at the center web. Since two of these beams are employed, they represent considerable portion of the entire weight of the trailer platform structure.

SUMMARY OF THE INVENTION

The present invention is a recognition of a need for a lightweight trailer construction, which is equivalent in strength to the structure described above but which is considerably lighter. Because load limits for a truck are established by law, any weight removed from the trailer platform construction results in additional weight for cargo and, therefore, additional cost-effectiveness and increased efficiency for a given implementation.

A floor assembly in accordance with the present invention comprises a pair of generally parallel main beams and a platform secured to the beams. The platform comprises a pair of spaced sheet-like members and at least one intermediate rigid foam layer between and secured to the sheet-like members. The sheet-like members have a thickness and comprise a material sufficient to provide tensile bending load support for expected loads on the platform. The foam layer is constructed of such material and has a thickness so as to support expected shear loads borne by the platform.

In one embodiment, the platform is constructed to be used as a trailer for pulling by a truck tractor in which the main beams extend from a front trailer region to a rear trailer region and include means for securing the beams to the tractor at the front region.

In accordance with a further embodiment, the sheet-like members comprise an upper floor member and a lower member. The platform includes a plurality of floor beams depending from the floor member into the at least one foam layer for supporting bending and shear loads borne by the platform and for securing the foam layer to the upper floor member.

In accordance with a further embodiment, the floor member comprises a plurality of sheet-like sections, each section having at least one floor beam depending therefrom.

In a further embodiment, the sections each include mating interlocking means at first and second edges. As a result, the sections interlock with each other and further include a weld joint at the interlocking means.

IN THE DRAWING

FIG. 4 is an isometric sectional view partially fragmented illustrating a portion of the embodiment of FIG. 3;

FIG. 5 is a more detailed elevation section is a metric view of a portion of the embodiment of FIG. 4 taken at region 5; and FIG. 6 is a more detailed fragmented isometric sectional view of a portion of a main beam and a floor beam used in the embodiment of FIGS. 1-3.

DETAILED DESCRIPTION OF THE PREFERRED EMBODIMENTS

Figure 1:
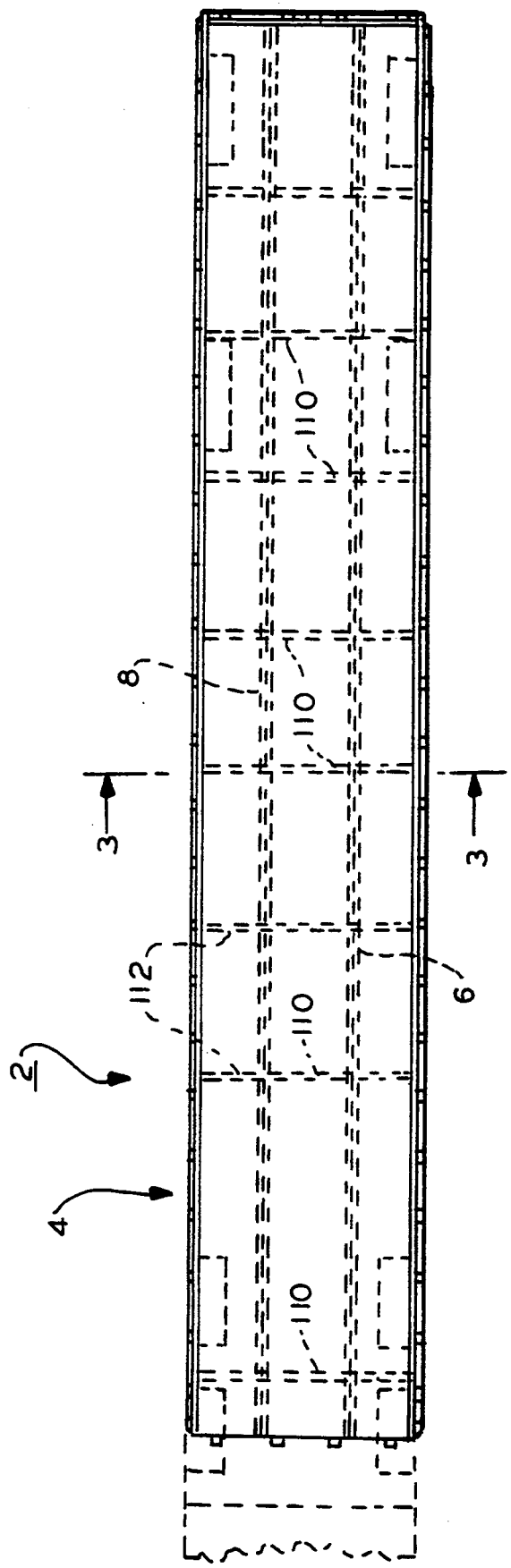
FIG. 1 is a plan view of a trailer for use with a truck tractor in accordance with one embodiment of the present invention.
Figure 2:
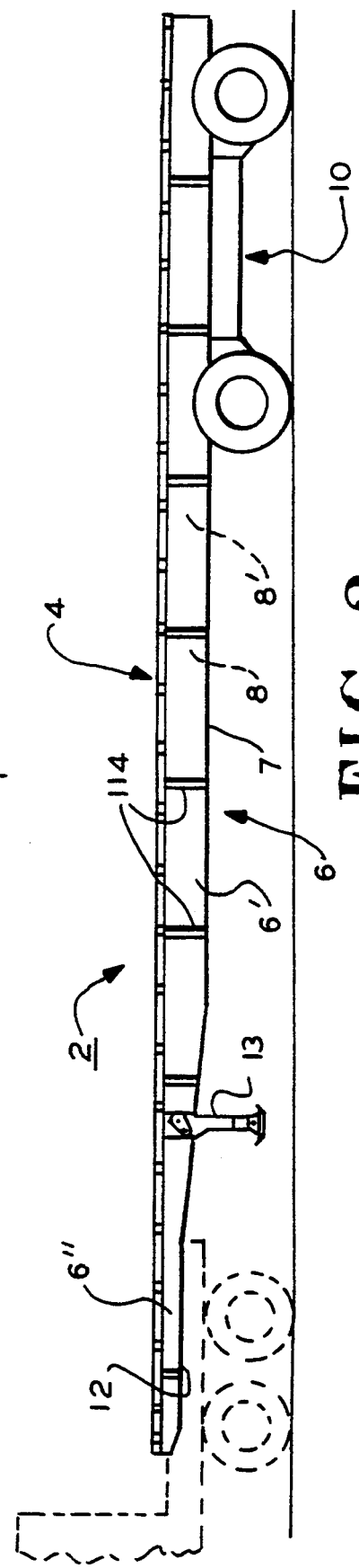
FIG. 2 is a side-elevation view of the trailer of FIG. 1.

In FIGS. 1 and 2, truck-trailer 2 comprises a platform assembly 4 secured on a pair of parallel front-to-rear extending main beams 6 and 8. A bogie assembly 10 is secured to the rear of the trailer and a front trailer support 12 is secured at the front region of the trailer 2.

Figure 3:
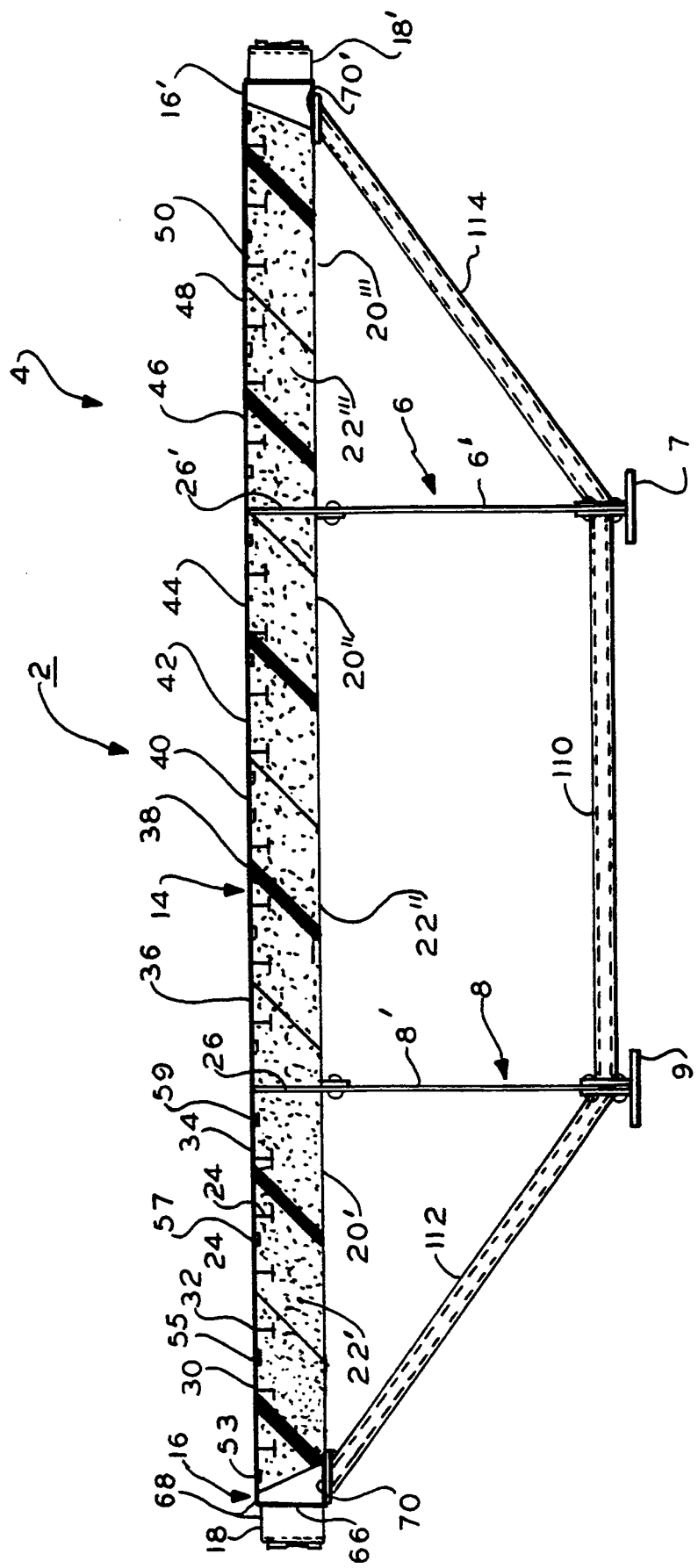
FIG. 3 is a sectional elevation view of the trailer of FIG. 1 taken along lines 3—3.

As best seen in FIG. 3, the main beams 6 and 8 are identical and, therefore, a description of one will be representative. The main beam 6 comprises a vertical web 6' and a bottom horizontal flange 7. Web 6' and flange 7 extend for the length of the beam 6 and trailer 2. However, as seen in FIG. 2, the web 6" at the front of the trailer has a web height less than the remainder of the web, e.g., 3 to 4 inches as compared to a web height central of the trailer which may be about 20 inches. The web 6' may be reduced in vertical height somewhat at the rear of the trailer, as shown. The bottom flange 7 extends along the base of the web for the entire length of that beam. The beam 8 has a vertical web 8' and a bottom flange 9, which are identical to the respective web 6' and flange 7 of beam 6.

The platform assembly 4 is secured to the beams 6 and 8 at the upper edges of the webs 6' and 8', respectively. The platform assembly 4 comprises a floor assembly 14, preferably of extruded aluminum components. The assembly 4 further includes two U-shaped side rails 16 with one leg 68 thereof coextensive and flush with the floor assembly 14 and a second leg 70 coextensive with the base of the platform assembly 4, comprising a bottom skin layer which comprises three sections 20', 20" and 20''', preferably aluminum sheet metal. Section 20' is connected in the region between beam 8 and the lower leg 70 of side-rail 16, whereas section 20''' is connected in a region between beam 6 and the lower leg 70' of side rail 16' on the opposite side of the trailer. Section 20" is connected between beams 6 and 8. Each of the sections 20', 20" and 20''' extend for the entire length of the trailer, as does the floor assembly 14 and side-rails 16 and 16'. A conventional rub and pocket rail 18 and 18' are on opposing sides of the platform assembly 4 exterior the side-rails 16 and 16'. Respective rigid foam layers 22', 22" and 22''', preferably polyurethane foam, are sandwiched between the floor assembly 14 and bottom skin sections 20', 20" and 20''' for the length of the platform assembly 4. Side rail 16 encloses the outer side of foam layer 22' and side rail 16' encloses the outer side of foam layer 22'''. The layers 22' and 22" are separated by H-shaped beam 26, whereas the layers 20" and 22''' are separated by H-shaped beam 26', identical to beam 26. The beams 26 and 26' extend for the length of the trailer and are secured to the respective webs 8' and 6' of beams 8 and 6. Beams 26 and 26' are formed of extruded aluminum.

Floor assembly 14 includes a plurality of sections 30, 32, 34, 36, 38, 40, 42, 44, 46, 48, and 50. All of these sections extend for the length of the trailer from front to rear. Certain of the sections are mirror images of each other. For example, sections 30 and 50 are mirror images, sections 32 and 48, sections 34 and 46, sections 36 and 44, and sections 38 and 42 are all respective mirror image pairs. A relatively narrow central section 40 is between and connected to sections 38 and 42. All of the sections are formed of extruded aluminum. Section 30 is connected to side-rail 16 via joint 53. Sections 30 and 32 are connected by joint 55, sections 24 and 32 are connected by joint 57, and section 34 is connected to beam 26 by joint 59. Similar joints connect each of the remaining sections in a manner to be described.

An array of parallel beams 24 depends from the sections 30–50, with the exception of central section 40 from which no beam depends. Two beams 24 depend from each of the sections on each side of central section 40. The beams 24 are all identical and depend partially into the foam layers 22', 22" and 22'''. The foam layers 22', 22" and 22''' may be, for example, about 3 inches in depth between floor assembly 14 and bottom skin sections 20', 20" and 20'''.

Representative section 30 and side-rail 16 are illustrated in FIG. 4. In FIG. 4, section 30 comprises a generally horizontal platform member 52 forming an upper floor load-bearing support member. Upstanding from member 52 are a plurality of longtidunally extending ridges 54. The ridges 54 extend for the length of the trailer and are not shown in FIG. 1. Parallel to ridges 54 are a plurality of spaced grooves 56. As shown, there are two ridges 54 between the next adjacent grooves 56. However, there may be more or fewer grooves and ridges according to a given implementation. A beam 24 depends from the region of the platform member 52 beneath and aligned with a groove 56. The beam 24 comprises a web 58 and a horizontal bottom flange 60. The web depends vertically from beneath groove 56 and the horizontal flange 60 is distal the platform member 52. The groove 56 is somewhat V-shaped and lightens the floor somewhat. The web 58 is integral with member 52 and is formed as a continuous extrusion therewith. Thus, a portion of the platform 14 extending left to right in FIG. 4 from the groove 56 serves as a horizontal flange for the upper portion of web 58 forming beam 24. All of the beams 24 are identical in web 58 height, flange 60 width and thickness and extend for the length of the platform member 52. Thus, as shown, the member 52 is generally planar, notwithstanding the grooves 56 and the upstanding ridges 54. The section 30 member 52 has a longitudinally extended edge 62 on one side and a second edge 64 on the other opposite side extending for the length of the section.

Side-rail 16 comprises a vertical web 66, horizontal upper leg 68, and horizontal lower leg 70 which legs respectively extend from the upper and lower edges of the vertical web 66. The horizontal upper leg 68 terminates in a longitudinally extending edge 72. Edge 72 of leg 68 is identical to edge 64 of section 30.

Intermediate section 32 has an edge 74, which is identical to edge 62 of section 30. Edges 64 and 74 mate in complimentary fashion and are keyed to interlock whereas edges 62 and 72 which are identical to edges 74 and 64, respectively, also mate in keyed interlocking relation in complimentary fashion. Edge 62 has an interlocking configuration 76 whereas edge 72 of leg 68 has an interlocking arrangement 78. The interlocking arrangements 76 and 78 are the same for all the sections of the platform assembly 14.

A representative keyed interlocking arrangement 76 and 78 are illustrated in FIG. 5. In arrangement 78, leg 68 has an upper surface 80. This surface merges with an inclined surface 82. A hook 84 extends from leg 68 and forms a channel 86. The complimentary arrangement 76 of section 30 includes an inclined surface 88 which forms with surface 82 a somewhat V-shaped groove in which a recessed weld 90 is located. The weld 90 joins leg 68 to member 52. The member 52 terminates in a tongue 92. Tongue 92 is closely rotatably received in channel 86. A flange 94 extends from platform 52 beneath and spaced from tongue 92 to form a channel 95 which rotatably receives hook 84. The hook 84 and tongue 92 are each inclined relative to a horizontal plane so that the side rail 16 and platform 52 cannot be disengaged by translation displacement away from each other in a horizontal plane but, rather, need to be rotated relative to one another in order to engage or disengage. Each of the sections 30, 32, 34, and so on are interlocked in similar fashion. The weld 90 permanently secures and seals the different sections or section and side rail, as the case may be, to provide a watertight joint as well as a structural connection. The welds 90 are depressed below the upper surface of the platform 52 and surface 80 of leg 68 of the side rail 16 so as not to be worn by a cargo resting on the platform 52 or side rail 16 leg 68.

In FIG. 6, a representative H-shaped beam 26 is connected to a representative main beam 8. Beam 26 has a vertical web 96, a right-extending lower flange 98 and a left-extending lower flange 100. The beam 26 has an upper flange 75 with portions 77 and 79 overlying lower respective flanges 98 and 100. Lower flanges 98 and and upper flange 75 forms an I-beam with web 96. A vertical depending member 102 depends from flange 98 adjacent to its junction with web 96, but offset from the plane of web 96. Junction 104 between the upper edge of member 102 and flanges 98 and 100 is of greater thickness to form a reinforced structure for reinforcing the attachment of the member 102 to the beam 26 web 96 and flange 98. The flanges 98 and 100 also have a greater thickness in the region adjacent to member 102 and web 96. This is to provide additional strength for bending moments induced by the vertical web 8' of beam 8. The upper edge region 106 of web 8' is bolted to the member 102 via bolts 108 at spaced regions along the web 8' and member 102. Other fastening arrangements may be used such as welds or rivets in accordance with a given implementation. The beam 26, however, as mentioned previously, is extruded aluminum whereas the beam 8 is preferably steel but may be aluminum. The aluminum beam 26 therefore is lighter than the corresponding material of an all-steel beam, which would extend for the region of beam 26. Thus, hundreds of pounds of weight are removed by substituting a portion of the beam 8 with aluminum H-beam 26.

In FIG. 3, tubes 110, 112 and 114, preferably aluminum, brace a lower region of main beam 6 and 8 adjacent to their respective flanges 7 and 9 and the outer portions of the platform assembly 4 at the side rails 16 and 16' lower legs 70 and 70'. Tubes 110, 112, and 114 are identical in cross section. The tube 110 is bolted at each end via a flange to the respective webs 8' and 6' of the main beams. Tube 112 is bolted to the lower edge region of web 8' and leg 70 of side rail 16 by respective flanges at the ends of the tube 112. Tube 114 is identical to tube 112 and is bolted similarly to the web 6' of beam 6 and side rail 16'. The braces 110, 112 and 114 are in a spaced array along the length of the trailer as illustrated in FIGS. 1 and 2. The braces 112 and 114 are representative and may differ in length in accordance with the height of the respective main beam 6 and 8 to which they are attached.

In FIG. 3, the rigid foam layers 22', 22'' and 22''' are all of the same height and totally fill the volume between the respective bottom skin sections 20', 20'' and 20''' and the upper floor assembly 14. By way of example, the beams 24 may have a vertical web 58 height of about one inch. The vertical web 96 of H beams 26 may have a vertical height of about 5 inches. However, these dimensions may differ in accordance with different implementations and the desired strength of a given trailer.

The thickness of the foam layer 20 depends, of course, on the strenth of the foam material beam utilized. In this example, a rigid polyurethane foam is used but other rigid structural load bearing thermoplastic or thermosetting foams may be used in the alternative. Their thicknesses may vary accordingly from those dimensions given herein. An important aspect is that the foam layers are relatively light and, in combination with the relatively thin skin layers at the bottom and the extruded aluminum floor assembly 14 at the top, offer considerable reduction in weight as compared to prior art steel beams which are of deeper dimensions than the steel beams 6 and 8 of the present embodiment. While the orientation of the depending beams 24 is shown extending from front to rear, it should be apparent that they may be oriented in a transverse direction normal to the direction shown, in accordance with a given implementation. The beams 24 provide both support for bending loads as well as provide a structure for interlocking the foam layers to the upper floor assembly 14. The bottom skin layers which are preferably sheet aluminum may have a thickness of 0,040 inches and are bonded to the foam layers 20. To bond the skin layers, they are cleaned and primed. Bonding with the foam then occurs naturally. It should be understood the term bond in the claims included welding, glueing or any other joining of materials using a bond media.

There thus has been shown a composite platform assembly for use in a truck trailer which is of relatively light weight and comparable in strength and stiffness to an all-steel main beam trailer chassis. It should be understood that the embodiments given herein are by way of example and not limitation. It is within the intention of the present invention that the scope of the present invention is determined by the appended claims and that variations and modifications to the disclosed embodiments will occur to one of ordinary skill in the art within the scope of the appended claims.

What is claimed is:

1. A trailer for use with a truck tractor comprising:
    a pair of generally parallel main beams each comprising a vertical web having an upper edge region and a lower edge region and a lower horizontal flange secured to said web at said lower edge region, said beams extending in a direction from a trailer front region to a rear region and means for securing the beams to said truck at said front region; and
    a load bearing platform secured to said beams, said platform forming at least one upper horizontal flange for each said vertical webs at said upper edge region, said platform comprising a pair of spaced metal sheet-like members and at least one relatively intermediate rigid foam layer between and secured to said sheet-like members wherein said sheet-like members are constructed to be sufficiently strong to provide support for tensile bending loads and said at least one foam layer is constructed sufficiently thick and of such material so as to provide support for shear loads borne by said platform.

2. The trailer of claim 1 wherein said sheet-like members comprise at least one upper floor member and a lower member, said platform including a plurality of floor beams depending from the floor member into said foam layer for supporting said bending and shear loads and for securing the at least one foam layer to said upper floor member.

3. The trailer of claim 2 including at least one further upper floor member comprising an H-shaped I beam including an upper flange and a lower flange, and means for securing the I beam to said vertical web to form said at least one upper horizontal flange.

4. The trailer of claim 3 wherein said at least one upper floor member forms a plurality of sections each having opposing longitudinally extending edges extending in said direction, said sections each include mating interlocking means at opposing edges, said I beam upper flange including said interlocking means for interlocking with adjacent ones of said sections.

5. The trailer of claim 1 wherein the spaced sheet-like members comprise a plurality of extruded upper members and a plurality of lower members, said vertical web having an upper edge distal said lower horizontal flange, one of said upper members being attached to the upper edge of one of said main beams to form an upper horizonal flange for the one main beam and a second of said upper members being attached to the upper edge of the other of said main beams to form an upper horizontal flange for the other main beam.

6. The trailer of claim 2 wherein said floor beams each comprise a web member having upper and lower edges, said web member depending from the upper floor member at its upper edge wherein the floor member forms an upper transverse flange for said web at said web member upper edge and further including a lower transverse flange at said web member lower edge.

7. The trailer of claim 5 including means for securing said vertical web to said platform and includes a further vertical web depending from said main beam lower horizontal flange and means for securing the further vertical web to a corresponding main beam vertical web upper edge region.

8. The trailer of claim 2 wherein said upper floor member comprises extruded aluminum.

9. The trailer of claim 2 wherein said upper floor member has a recess in an upper load bearing surface thereof aligned over and extending for the length of each said depending floor beams.

10. The trailer of claim 9 wherein said upper floor member comprises a plurality of sections each extending in a front-to-rear direction, said floor beams and floor member recess extending in said front-to-rear direction.

11. The trailer of claim 2 wherein each said main beams vertical web has a height between its flanges greater than the height of the floor beams in a direction into said foam layer normal to the plane of said layer.

12. The trailer of claim 2 wherein one of said floor beams comprises a floor beam web lying in a plane and having upper and lower edges, said latter web being parallel to said main beam vertical web, and said one floor beam having a lower transverse flange member at said lower floor beam web edge extending for the length of said floor beam web, and a depending web section depending from said lower transverse flange for securing thereto said main beam web.

13. The trailer of claim 12 wherein the depending web section lies in a plane offset from the plane of the floor beam web.

14. The trailer of claim 13 wherein the depending web section has a thickness greater than the floor beam web and the lower transverse flange member has a thickness greater at the junction with said floor beam web and lower transverse beam web than at said floor beam web.

15. The trailer of claim 2 including a pair of side rail members each having a base wall and a pair of legs forming a U-shaped channel, an upper one of said legs being secured to, coextensive with and extending along the upper floor member at an upper floor member edge, the other of said legs forming a lower leg and being secured to said lower member, said side members each being secured to said upper and lower members for enclosing said at least one foam layer in a front and rear direction along the sides of said platform.

16. The trailer of claim 15 wherein said upper leg has an edge extending in a front-to-rear direction interlocked with and welded to an edge of the upper floor member.

17. The trailer of claim 11 wherein each said floor beams has opposing edges each interlocked with a different edge of a different one of said at least one upper floor member.

18. The trailer of claim 1 wherein the foam layer comprises a hardened plastic material.

19. The trailer of claim 18 wherein the foam is polyurethane.

20. The trailer of claim 17 wherein the upper floor member has a load bearing upper surface comprising a plurality of spaced upstanding ridges and a plurality of spaced elongated depressions extending parallel to said main beams.

21. The trailer of claim 2 wherein said main beams are steel and the vertical web is normal to said platform and the lower horizontal flange is transverse the web and parallel to said platform, said at least one upper horizontal flange comprising extruded aluminum.

22. The trailer of claim 21 wherein the upper floor member comprises a plurality of sections each having opposed mating edges and interlocked at said mating edges in a front-to-rear direction and bonded at and along said mating edges to form a structural and moisture impervious joint.

23. A floor assembly comprising:
a pair of generally parallel main beams, each comprising a main web having an upper edge region and a lower edge region and a lower flange transverse the web at said web lower edge region extending for the length of the beams; and
a platform secured to said beams, said platform forming at least one upper flange for said main web transverse said web at said web upper edge region, said platform comprising spaced upper and lower sheet-like members lying in parallel planes and at least one intermediate foam layer between and secured to said sheet-like members, said upper sheet-like member comprising extruded material, said sheet-like members having a thickness and comprising a material sufficient to provide tensile bending load support for expected loads on said platform, said foam layer being constructed of such material and having a thickness so as to support expected shear loads borne by said platform.

24. The assembly of claim 23 wherein the upper member includes a plurality of floor beams depending therefrom to provide further load support and means for securing the at least one foam layer to said upper member.

25. The assembly of claim 24 including plurality of side rail members having a pair of legs, each leg for attachment to a different one of said upper and lower members and for enclosing a corresponding edge of said at least one foam layer.

26. The assembly of claim 24 wherein said upper member includes a plurality of sections one of which comprises an I beam having a web and an upper flange and a lower flange secured to the I beam web, others of said sections including said floor beams, said I beam upper flange including means for securing a section thereto on each side of said I beam web, and each main beam web is secured to and depends from a different one of said I beams at said I beam lower flange.

27. The assembly of claim 26, wherein the I beams are extruded aluminum and the main beams are steel.

28. A floor assembly having first and second opposing sides for use with a trailer, comprising:
  a) a plurality of extruded elongated aluminum members, each having an upper, generally planar surface bounded by first and second spaced, parallel, longitudinal edges, the members each including:
    i) an interlocking key of a first type extending along the first edge,
    ii) an interlocking key of a second type extending along the second edge, the first key on one member and the second key on an adjacent member being complementarily interlockable so that the upper surfaces of the members form a continuous, planar floor surface, and
    iii) a downward, longitudinally extending projection integral with each member between the longitudinal edges thereof; and
  b) a central, longitudinally extending, extruded aluminum H-shaped member having first and second flanges each having opposing longitudinally extending edges and a connecting web, wherein the first flange has, running longitudinally along its opposed edges, a key of the first type, interlockable with the key of the second type on the corresponding edges of adjacent members so that a surface of the first flange forms a continuous planar floor surface with the upper surfaces of the members.

29. The assembly of claim 28 further including a channel-shaped side rail at each said sides, each rail having a pair of spaced legs and a connecting portion, one leg of each side rail having a free edge which terminates in a key of the second type which is interlockable with the key of the first type on the edge of an adjacent member so that a surface of the leg forms a continuous planar floor surface with the upper surface of the members;
  an aluminum skin connected between each end of the second flange of the H-shaped member and one end of the other leg of the side rail to define a volume bounded by the skin, the lower surface of the members, the leg-connecting portion of the side rail and the web of the H; and
  a mass of rigid foamed plastic filling the volume so that the projections extend thereinto to lock the plastic to the member so that the plastic imparts shear rigidity to the floor assembly and the members and the skin impart bending rigidity to the floor assembly.

30. A floor assembly as in claim 29, wherein the interlocked first and second key structures define longitudinal depressions in the floor, the adjacent members, side rails and H member being welded together along the depressions.

31. A trailer for use with a truck tractor comprising:
  a pair of generally parallel main beams extending in a direction from a trailer front region to a rear region and means for securing the beams to said truck at said front region;
  a platform secured to said beams, said platform comprising a pair of spaced metal sheet-like members and at least one relatively intermediate rigid foam layer between and secured to said sheet-like members wherein said sheet-like members are constructed to be sufficiently strong to provide support for tensile bending loads and said at least one foam layer is constructed sufficiently thick and of such material so as to provide support for shear leads borne by said platform; said sheet-like members comprising at least one upper floor member and a lower member, said platform including a plurality of floor beams depending from the floor member into said foam layer for supporting said bending and shear loads and for securing the at least one foam layer to said upper floor member;
  each said main beam comprises a web having upper and lower edges and lying in a plane normal to said platform and a flange at said lower edge extending for the length of that main beam transversely said web, each main beam being secured at a region adjacent to its upper edge to a different one of said floor beams;
  each said different one floor beam comprising a floor beam web lying in a plane having upper and lower edges and parallel to said main beam web and a lower transverse flange member at said lower floor beam web edge extending for the length of said floor beam web, and a depending web section depending from said lower transverse flange for securing thereto said main beam web.

32. A floor assembly having first and second opposing sides for use with a trailer, comprising:
  a) a plurality of extruded elongated aluminum members, each having an upper, generally planar surface bounded by two spaced, parallel, longitudinal edges, the members each including:
    i) an interlocking key of a first type extending along the first edge;
    ii) an interlocking key of a second type extending along the second edge, the first key on one member and the second key on an adjacent member being complementarily interlockable so that the upper surfaces of the members form a continuous, planar floor surface; and
    iii) a downward, longitudinally extending projection integral with each member between the longitudinal edges thereof; and
  b) a relatively central, longitudinally extending, extruded aluminum H-shaped member having a first and a second flange each having opposing longitudinally extending edges and a connecting web, wherein the first flange has, running longitudinally along its opposed edges, a key of the first type, interlockable with the key of the second type on the corresponding edges of adjacent members so that a surface of the first flange forms a continuous planar floor surface with the upper surfaces of the members;
  a channel-shaped side rail at each said sides, each rail having a pair of spaced legs and a connecting portion, one leg of each side rail having a free edge which terminates in a key of the second type which is interlockable with the key of the first type on the edge of an adjacent member so that a surface of the leg forms a continuous planar floor surface with the upper surface of the members;
  an aluminum skin connected between each end of the second flange of the H-shaped member and one end of the other leg of the side rail to define a volume bounded by the skin, the lower surface of the members, the leg-connecting portion of the side rail and the cross-member of the H; and
  a mass of rigid foamed plastic filling the volume so that the projections extend thereinto to lock the plastic to the member so that the plastic imparts shear rigidity to the floor assembly and the members and the skin impart bending rigidity to the floor assembly.

* * * * *